US005158313A

United States Patent [19]

Becker

[11] Patent Number: 5,158,313

[45] Date of Patent: Oct. 27, 1992

[54] WHEELED WALKER

[76] Inventor: Sharon L. Becker, 119 Edgewood St., Delta, Ohio 43515

[21] Appl. No.: 743,794

[22] Filed: Aug. 12, 1991

[51] Int. Cl.[5] .......... B62B 7/00

[52] U.S. Cl. .......... 280/87.021; 135/67; 135/75; 482/68; 280/87.05; 297/5; 403/104; 403/110

[58] Field of Search .......... 280/87.05, 87.02, 87.03, 280/87.04; 297/5; 135/67, 74, 75, 76; 272/70.3; 403/104, 109, 110

[56] References Cited

U.S. PATENT DOCUMENTS

| | | | |
|---|---|---|---|
| 1,307,058 | 6/1919 | McGrath | 297/5 |
| 2,077,569 | 4/1937 | Kish | 135/67 |
| 2,367,196 | 1/1945 | Butler | 403/104 |
| 2,459,066 | 1/1949 | Duke | 155/22 |
| 3,180,678 | 4/1965 | McCabe | 297/5 |
| 4,065,145 | 12/1977 | Chambers | 280/87.02 |
| 4,068,857 | 1/1978 | Karlsson | 297/5 |
| 4,159,110 | 6/1979 | Dodenhoff | 272/70.3 |
| 4,239,248 | 12/1980 | Ewers | 280/42 |
| 4,307,715 | 12/1981 | Fante | 128/80 |
| 4,558,893 | 12/1985 | Shelly | 403/104 |
| 4,861,051 | 8/1989 | Napper | 280/87 |
| 5,020,560 | 6/1991 | Turbeville | 297/5 |

FOREIGN PATENT DOCUMENTS

| | | | |
|---|---|---|---|
| 1163120 | 9/1958 | France | 297/5 |
| 1048148 | 11/1966 | United Kingdom | 272/70.3 |

*Primary Examiner*—Eric D. Culbreth

*Attorney, Agent, or Firm*—Willian Brinks Olds Hofer Gilson & Lione

[57] ABSTRACT

A wheeled walker for ambulatory patients and people requiring support while walking includes an adjustable and separable frame and an adjustbable height seat and handlebar. The frame includes a front generally inverted U-shaped section coupled to and supported by fixed front wheels. A height adjustable handlebar is slidably and lockably received in the front frame section. A centrally disposed frame member is curved and directed to the rear. The rear frame section includes a member which adjustably couples to the centrally disposed front frame member and a vertically adjustable seat. The lower portion of the rear frame section is bifurcated and receives a pair of pivotable casters.

20 Claims, 3 Drawing Sheets

WHEELED WALKER

BACKGROUND OF THE INVENTION

The invention relates generally to devices for assisting people who are temporarily or chronically experiencing difficulty walking and more specifically to a wheeled walker having an adjustable height handlebar and seat having adjustable separation.

Significant resources have been directed to assisting people with congenital, accidental or degenerative damage to the legs which interferes with or precludes the ability to walk or move about in any fashion. Such devices may be classified by various distinct characteristics: steerable and non-steerable, occupant standing and occupant seated and three-wheeled or four-wheeled.

The latter classification parameter is helpful in that it is especially distinct. Walking assistance devices incorporating three-wheels are presented in U.S. Pat. Nos. 4,065,145, 4,159,110, 4,239,248 and 4,307,715. U.S. Pat. No. 4,065,145 to Chambers teaches a three-wheeled vehicle for semi-ambulatory patients which is similar to a three-wheel scooter. A pair of rear wheels support an adjustable height seat and a forward, single wheel is pivotably supported by the frame and coupled to a pair of hand grips to provide steering. U.S. Pat. No. 4,159,110 to Dodenhoff discloses a folding wheeled walker having generally triangular frame sections which are supported upon a rear pair of fixed axis, caster sized wheels and a forward, centrally disposed pivotable caster. A fixed, U-shaped handlebar may be gripped by the user.

U.S. Pat. No. 4,239,248 to Ewers teaches a steerable, collapsible walker disposed on three relatively large, spoked wheels. The user sits on a centrally disposed seat and a middle wheel is steerable by an interconnected cable and lever system. U.S. Pat. No. 4,307,715 to Fante discloses another three-wheeled ambulatory aid. The walking aid includes a back bracing board which is strapped to the user and includes a pair of rear, diverging supports terminating in casters and a centrally disposed forward support also terminating in a caster and coupled to an adjustable T-shaped handlebar. The back brace board is supported and guided by a slidable interconnection to therapy walker railings.

Four-wheeled walking devices are exemplified by U.S. Pat. Nos. 1,307,058, 2,459,066, 3,180,678 and 4,861,051. In U.S. Pat. No. 1,307,058 to McGrath, an open rectangular frame includes a pair of fixed axis front wheels and pivotable rear wheels. The frame supports a centrally disposed seat and adjustable crutch staffs for supporting the user.

U.S. Pat. No. 2,459,066 to Duke teaches a vehicle similar to that disclosed in the above-discussed '058 patent and includes an open rectangular frame supported by four casters and an additional fifth caster in the middle intended to provide additional support for a seat. All five casters of the device are pivotable. The vehicle further includes handgrips and underarm, crutch-like supports. In U.S. Pat. No. 3,180,678 to McCabe, an exercise vehicle having a front, pivotable frame section with handlebars and a rear frame section supporting a seat also includes a respective front axle for supporting a pair of front wheels and a similar rear axle for supporting the rear wheels. The front axle and forward, pivotable portion of the frame are coupled to handlebars. The device also includes a U-shaped backrest which is disposed generally above the seat.

Finally, U.S. Pat. No. 4,861,051 to Napper discloses a rehabilitation walker device having an open, symmetrical frame defining a rearwardly canted handlebar portion and a pair of widely spaced front casters. To the rear, a pair of closely spaced casters supports a chair-like seat.

A review of the foregoing patented technology, while revealing certain features and advantages in individual devices, also reveals certain shortcomings. For example, certain of the devices are complex and therefore heavy and cumbersome. Such configurations do not encourage an already less than fit individual to utilize them. Secondly, many disclose supports, i.e., casters, which do not exhibit either resilience or obstacle clearing ability to render them comfortably functional on rough or irregular surfaces such as cracked sidewalk, grouted ceramic tile floors and the like. Also, the bulk of many designs draws attention to them and the user whereas lightness and compactness tend to reduce the self-consciousness of a person using a walker.

Finally, the devices exhibit varying degrees of adjustability and thus user comfort. Since the devices are intended to facilitate and encourage walking, it is highly desirable that they provide adjustments for the following three user related parameters: ground to seat height, ground to handlebar height and seating to handlebar horizontal spacing. Thus it is apparent that improvements in the art of walking assistance devices particularly wheeled walkers are both possible and desirable.

SUMMARY OF THE INVENTION

A wheeled walker for ambulatory patients and people requiring support while walking includes an adjustable, separable frame, an adjustable height seat and an adjustable height handlebar. The frame includes a front generally inverted U-shaped section coupled to and supported by fixed axis front wheels. A height adjustable handlebar is slidably and lockably received in the front frame section. A centrally disposed frame member is curved and directed to the rear. The rear frame section includes a member which adjustably couples to the centrally disposed front frame member and a vertically adjustable seat. This coupling also permits disassembly of the front and rear sections to facilitate transport of the walker in a car, station wagon or van. The lower portion of the rear frame section is bifurcated and receives a pair of pivotable casters. The walker may be fabricated of welded steel tubing or lighter weight material such as aluminum.

DESCRIPTION OF THE PREFERRED EMBODIMENT

Figure 2:
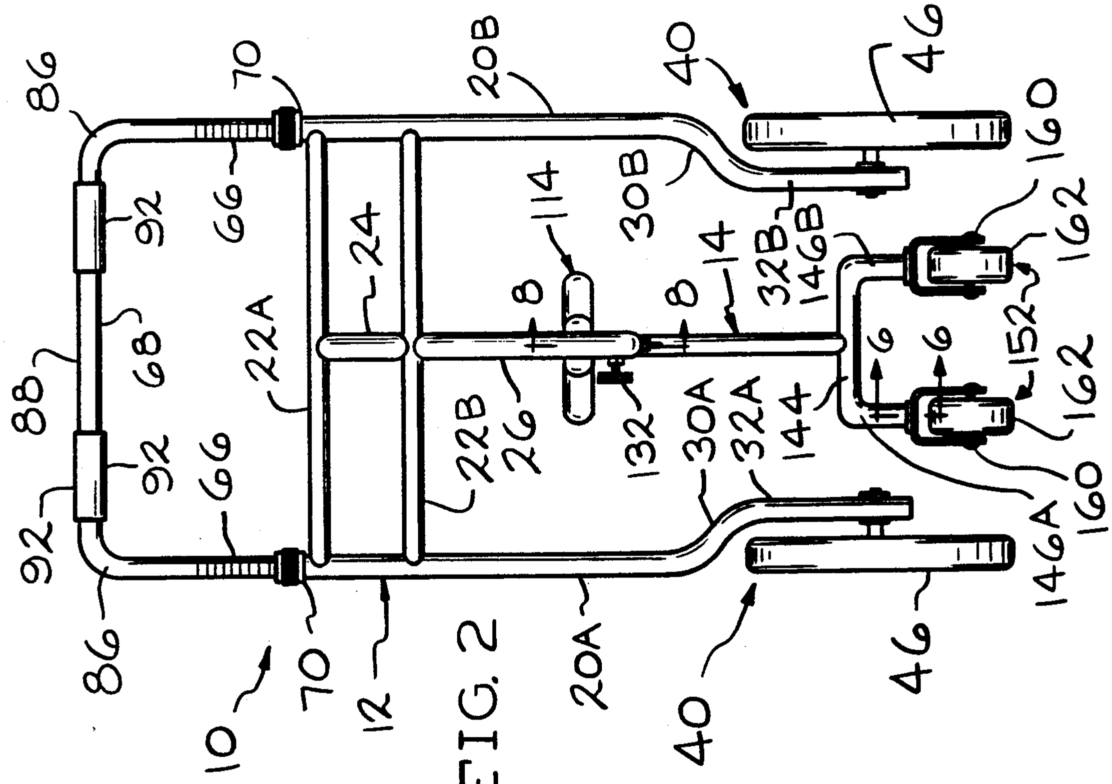
FIG. 2 is a front elevational view of a wheeled walker according to the present invention.
Figure 1:
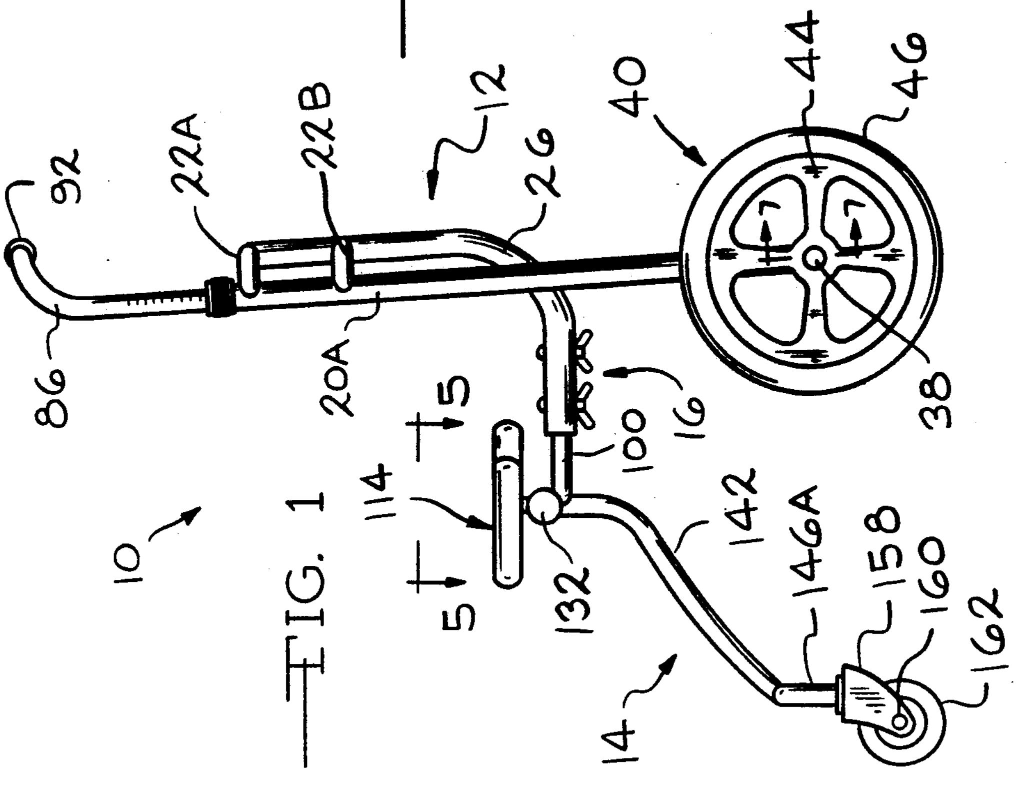
FIG. 1 is a side elevational view of a wheeled walker according to the present invention.

Referring now to FIGS. 1 and 2, a wheeled walker according to the present invention is illustrated and generally designated by the reference numeral 10. The wheeled walker 10 includes an inverted, generally U-shaped front frame assembly 12 and a centrally disposed rear frame assembly 14. The front frame assembly 12 and the rear frame assembly 14 are selectively and adjustable interconnected by a coupling assembly 16.

The front frame assembly 12 includes a pair of symmetrical left and right substantially vertically disposed tubular frame members 20A and 20B. Adjacent their upper termini, the tubular frame members 20A and 20B are coupled by a pair of spaced-apart tubular cross members 22A and 22B. The cross members 22A and 22B reside in a vertical plane parallel to and spaced forward of the vertical plane defined by the tubular frame members 20A and 20B and include curved terminal portions which couple to the frame members 20A and 20B. At the mid points of the cross members 22A and 22B, is disposed a vertical brace 24. Aligned with the vertical brace 24 and extending first downwardly in the vertical plane defined by the cross members 22A and 22B and then to the rear is a curved central frame member 26.

The tubular frame members 20A and 20B, the cross members 22A and 22B, the center brace 24 and the curved frame member 26 may be permanently secured at their intersections by weldments or other suitable well-known and conventional means such as interior plugs or bushings and axially extending threaded fasteners, for example. The tubular frame members 20A and 20B as well as the cross members 22A and 22B, the center brace 24 and the curved frame member 26 are preferably thin walled cold rolled steel tubes. Alternatively, tubular members fabricated of aluminum or titanium may be utilized to reduce the weight of the wheeled walker 10 without compromising its strength.

Adjacent the lower ends of the tubular members 20A and 20B are inwardly reverse curved sections 30A and 30B, respectively. The lower termini of the frame members 20A and 20B terminate in inwardly offset portions 32A and 32B which define axes parallel to and inwardly spaced from the respective frame members 20A and 20B.

Figure 7:
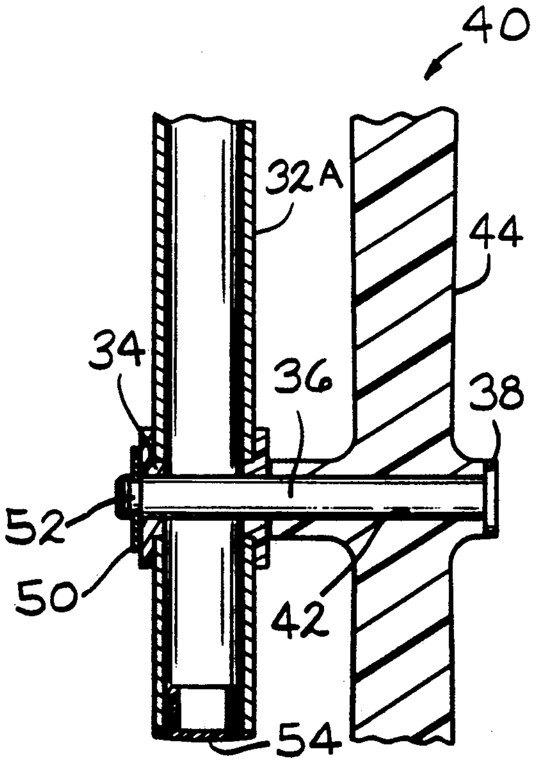
FIG. 7 is an enlarged, sectional view of the front wheel bearing taken along line 7—7 of FIG. 1.

Referring to FIGS. 1, 2 and 7, the terminal portions 32A and 32B of the frame members 20A and 20B, respectively, include a bushing 34. FIG. 7 illustrates the bushing 34 associated with the left frame member 20A and the terminal portion 32A. It will be appreciated that the right frame member 20B includes the identical components and mechanical configuration. The bushing 34 rotatably supports a stub shaft 36 having an enlarged diameter terminal portion or head 38 which limits the axial translation of the stub shaft 36 in one direction. The stub shaft 36 and the head 38 rotatably support and retain, respectively, a relatively large diameter wheel and tire assembly 40. The wheel and tire assembly 40 may include a centrally disposed bushing 42, a radially extending solid or spoked disc 44 and a solid or hollow tire 46 fabricated of rubber or other suitable elastomer. A snap ring 50 or other fastening means is received within a circumferential groove 52 in the stub shaft 36 and retains the tire and wheel assembly 40 thereupon. Alternatively, a cotter pin disposed in a radial opening in the stub shaft 36 may be utilized. If desired, the lower end of the terminal portion 32A may be capped by a plastic or metal plug 54.

As illustrated in FIG. 2, the extent of the offset provided by the reverse curved sections 30A and 30B in the tubular frame members 20A and 20B is such that the outside faces of the tire and wheel assemblies 40 is in substantial alignment with the outer edges of the corresponding tubular frame members 20A and 20B when the wheeled walker 10 is viewed from the front as illustrated in FIG. 2. This feature provides maximum lateral stability to the wheeled walker 10 with minimum width. Furthermore, since the wheel and tire assemblies 40 are approximately vertically aligned with the tubular members 20A and 20B, the downward forces exerted on the wheeled walker 10, specifically those carrie by the tubular members 20A and 20B, through the respective tire and wheel assemblies 40 to the supporting ground, are in substantial alignment, further improving the stability of the wheeled walker 10.

Figure 3:
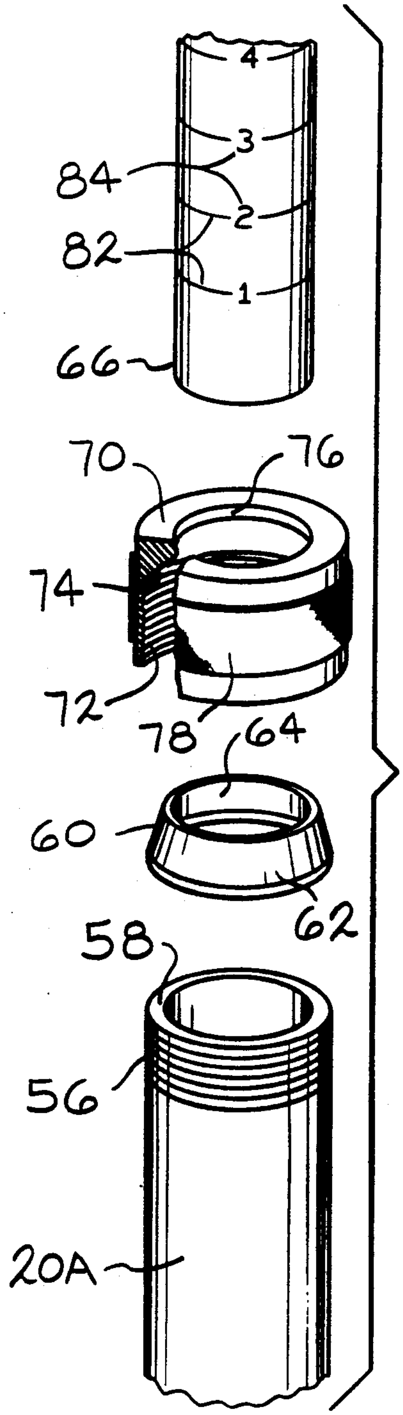
FIG. 3 is a exploded perspective view of the handlebar height adjusting mechanism according to the present invention.

Referring now to FIGS. 1, 2 and 3, the upper ends of the tubular members 20A and 20B terminate in a region of male threads 56. In FIG. 3, only the tubular member 20A is illustrated. It will be appreciated, however, that the adjustment mechanism to be described is identical with the mechanism utilized in the tubular member 20B and provides the identical mechanical function. The end of the tubular member 20A defines a flat radially extending surface 58 upon which is received a relatively soft and resilient annulus 60. The resilient annulus 60 may be rubber or similar elastomer which is compressible, deformable and exhibits good plastic memory. The resilient annulus 60 includes an oblique outer surface 62 and thus defines a frusto-conical cross section and further defines a through aperture 64 having an inside diameter which is approximately equal to and which slidingly receives the terminal portion 66 of an inverted U-shaped handlebar 68.

A locking collar 70 having female threads 72 which are complementary to the male threads 56 on the tubular member 20A is threadably received thereupon. The locking collar 70 also includes an obliquely oriented surface 74 which is disposed parallel to the oblique surface 62 on the resilient annulus 60 and in contact therewith when the locking collar 70 is threaded upon the tubular member 20A as illustrated in FIGS. 1 and 2. The locking collar 70 also includes a reduced diameter aperture 76 at one end which loosely receives the terminal portion 66 of the handlebar 68. If desired, the exterior surface of the locking collar 70 may include knurling 78 or other frictional engagement improving surface treatment.

The terminal portions 66 of the handlebar 68 preferably include a plurality of axially spaced-apart circumferential or partially circumferential lines 82 and indicia 84 such as pairs of matching numbers, letters or symbols which facilitate uniform height adjustment on the left and right sides of the handlebar 68 when the locking collar 70 is loosened. When the handlebar 68 has been adjusted to the desired height and the indicia 84 and lines 82 have been visually checked to ensure that the handlebar is substantially level, the locking collars 70 may be rotated clockwise in conventional fashion to compress the resilient annulus 60 and inhibit axial translation of the terminal portion 66 of the handlebar 68.

As illustrated in FIG. 1, the handlebar 68 includes a pair of symmetrical complex bends 86 which position the horizontal portion 88 of the handlebar 68 forward of the plane defined by the tubular members 20A and 20B in somewhat forward of the vertical plane defined by the cross members 22A and 22B. To facilitate gripping of the handlebar 68 by the user, a pair of spaced-apart hand grips 92 reside upon and are secured to the horizontal forward portion of the handlebar 68. The hand grips 92 may be fabricated of any relatively soft material such as leather, foam rubber, foam padded vinyl and the like. If desired, of course, the handlebar 68 may be fully removed from the tubular frame members 20A and 20B and the direction of the complex bends 86 and thus the effective overhang of the horizontal portion 88 of the handlebar may be reversed such that it curves to the rear, placing the horizontal portion of the handlebar 88 and hand grips 92 more proximate the rear of the wheeled walker 10.

Figure 8:
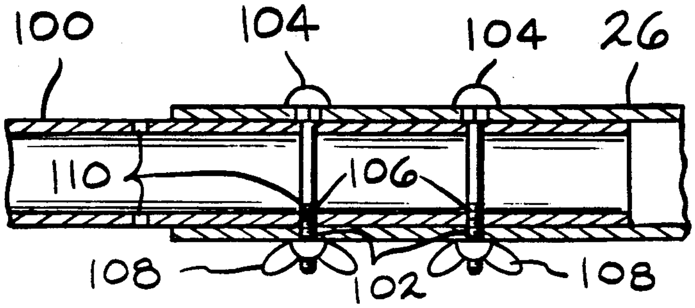
FIG. 8 is an enlarged, side view in full section of the frame adjusting means of a wheeled walker according to the present invention.

Turning now to FIGS. 1 and 8, the coupling assembly 16 disposed between and selectively coupling the curved frame member 26 of the forward frame assembly 12 and a forward, horizontal member 100 of the rear frame assembly 14 is illustrated. The curved frame member 26 is, as noted above, thin walled tubing having an outside diameter of, for example, one inch, wall thicknesses of 0.0625 inches and an inside diameter of 0.875 inches. The forward member 100 is slidingly received within the inside diameter of the curved frame member 26, having an outside diameter of slightly less than 0.875 inches. Similarly the wall thickness of the forward member 100 may be 0.0625 inches, for example. The curved member 26 includes at least two pairs of aligned openings 102. The upper openings of the pairs of openings 102 are square such that they receive a complementary portion of a pair of carriage bolts 104 and inhibit rotation thereof. The carriage bolts 104 include a threaded portion 106 and each receives a wing nut 108.

The forward member 100 includes a plurality of aligned openings 110 which are spaced-apart at distances equal to the spacing between the openings 102 and the carriage bolts 104. Accordingly, the wing nuts 108 may be removed from the carriage bolts 104 and the carriage bolts 104 temporarily removed from the curved frame member 26. At this time, the forward member 100 may be telescoped into the curved frame member 26 or extended therefrom to adjust the spacing or separation between the front frame assembly 12 and the rear frame assembly 14. By aligning the openings 110 with the openings 102, the carriage bolts 104 may be reinserted and the wing nuts 108, installed and retightened. The coupling assembly 16 also facilitates disassembly of the front frame assembly 12 from the rear frame assembly 14 to render lifting and transporting the wheeled walker 10 by car, station wagon or van convenient.

Figure 4:
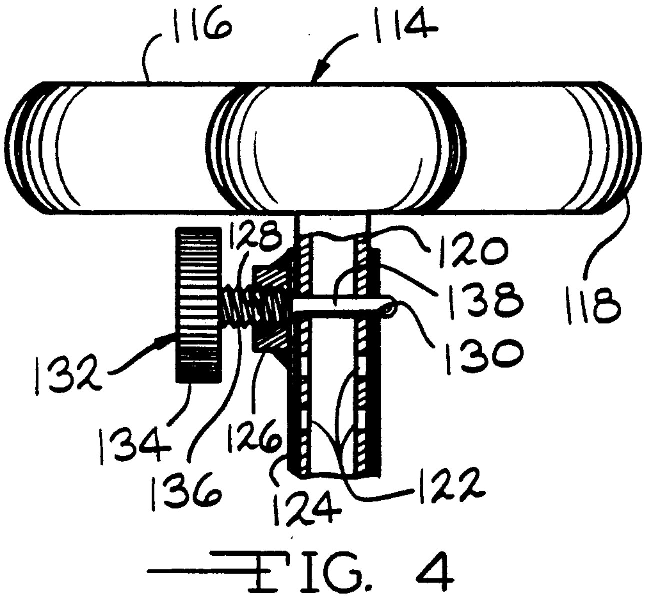
FIG. 4 is an enlarged, front elevational view in partial section of the seat height adjusting mechanism of a wheeled walker according to the present invention.
Figure 5:
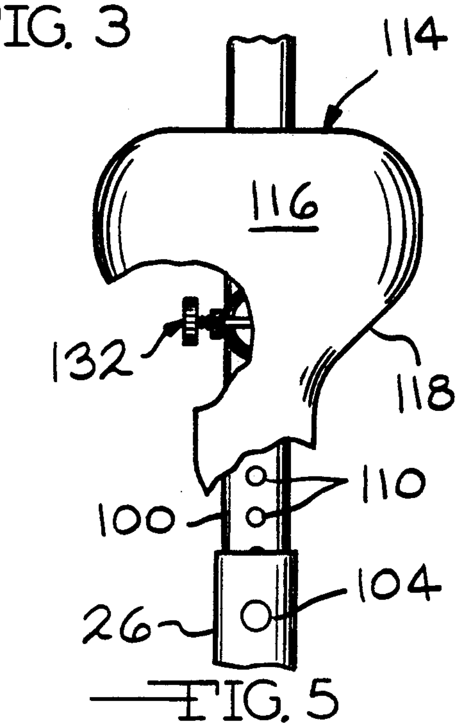
FIG. 5 is a top plan view with a portion broken away of a seat of a wheeled walker according to the present invention.

Referring now to FIGS. 1, 2, 4 and 5, the rear frame assembly 14 also includes a support 114 such as a saddle type or bicycle seat. The seat 114 includes a generally planar support area 116 and a curved periphery 118. Disposed perpendicularly to the support surface 116 is a tubular member 120 having a plurality of aligned openings 122 formed therein. As illustrated in FIG. 4, the openings 122 are disposed parallel to the transverse axis of the seat 114. The tubular member 120 is slidably received in a vertical stub portion 124 of the rear frame assembly 114. A bushing 126 having threads 128 such as a conventional nut is secured to the side of the vertical portion 124 by welding. Alternatively, the wall of the vertical portion 124 may be of sufficient thickness that the threads 128 may be formed therein. Aligned with the bushing 126 is an opening 130 in the stub portion 124 having a diameter equal to the openings 122 in the tubular member 120.

A set screw 132 includes a knurled thumb wheel 134, a region of male threads 136 which are received in the threads 128 of the bushing 126 and a pin 138 which is received within the openings 122 of the tubular member 120 and extends through the opening 130 in the stub portion 124. To adjust the height of the seat 114, the set screw 132 is rotated counterclockwise and removed from the bushing 126, the seat is raised or lowered to align a set of openings 122 with the threaded bushing 126 and opening 130 at the desired seat height and the set screw 132 is reinstalled and tightened.

Figure 6:
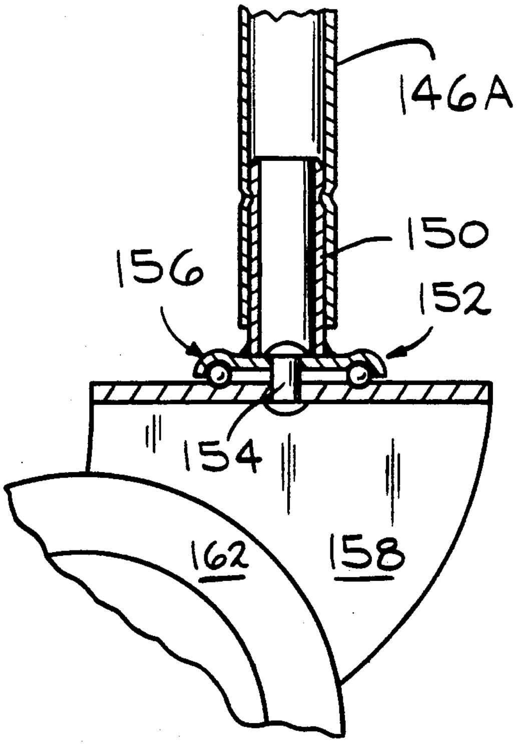
FIG. 6 is an enlarged, sectional view of a rear caster assembly taken along line 6—6 of FIG. 2.

Referring now to FIGS. 1, 2 and 6, the rear frame assembly 14 includes a depending and rearwardly directed member 142 which is either bifurcated into or coupled to an inverted U-shaped rear wheel support 144. The rear wheel support 144 terminates in a pair of vertically disposed termini 146A and 146B, the former of which is illustrated in FIG. 6 and both of which are identical. The rear member 144 and thus the terminus 146A is tubular and frictionally receives a mounting stanchion 150 of a conventional caster assembly 152. It will be appreciated that the wheeled walker 10 includes a pair of caster assemblies 152 as illustrated in FIG. 2 and that both are identical to the left caster assembly illustrated in FIG. 6. The caster assembly 152 includes a pivot pin 154 centrally disposed about a ball bearing assembly 156. The ball bearing assembly 156 and the pivot pin 154 rotatably couple a clevis member 158 to the stanchion 150. A permanently secured stub shaft 160 extending between the spaced-apart walls of the clevis member 158 in turn rotatably supports a caster wheel 162.

In addition to the height adjustability of the handlebar 88 and the seat 114 and the separation adjustability of the front frame assembly 12 and rear frame assembly 14, the basic scale, i.e., size, of the wheeled walker 10 and its component parts may vary to accommodate riders/walkers from children to adults. Accordingly, the components of the walker 10 may be sized to provide the following nominal dimensions which are all presented in inches. It will be appreciated that the three classes of users as well as the dimensions presented are given by way of illustration and example, not as limitations. Accordingly, such dimensions may be varied from those presented to accommodate specific uses and purposes.

TABLE I

| USER | SEAT HEIGHT | HANDLEBAR HEIGHT | FRONT WHEEL DIAMETER |
|---|---|---|---|
| Child | 10 | 20 | 6 |
| Youth | 18 | 34 | 9 |
| Adult | 25 | 45 | 12 |

The foregoing disclosure is the best mode devised by the inventor for practicing this invention. It is apparent, however, that devices incorporating modifications and variations will be obvious to one skilled in the art of walkers. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. An apparatus for assisting walking comprising, in combination,
a front frame assembly including a pair of parallel frame members spaced-apart a distance and having first and second ends,
a pair of rotatable wheels secured to said first ends of said frame members,
a U-shaped handlebar having ends spaced-apart said distance for sliding engagement with said second ends of said pair of parallel frame members,
means for releasably locking said handlebar to said frame member,
at least one cross bar extending between said parallel frame members, and
a rearward center member disposed between said parallel frame members and coupled to said cross bar,
a rear frame assembly including a seat, a forward center member and a bifurcated rear member, and
means for adjustably coupling said rearward center member of said front frame assembly and said forward center member of said rear frame assembly.

2. The apparatus of claim 1 wherein said coupling means includes a plurality of spaced-apart openings in said rearward center member and said forward center member and fastener means extending through aligned pairs of said openings.

3. The apparatus of claim 2 wherein said fastener means are a pair of bolts and wing nuts.

4. The apparatus of claim 1 wherein said means for releasably locking said handlebar is a threaded collar disposed about said handlebar and a resilient annulus disposed adjacent said collar.

5. The apparatus of claim 4 wherein said collar and annulus both include complementary oblique surfaces.

6. The apparatus of claim 1 wherein said parallel frame members include inwardly offset portions adjacent said first ends.

7. The apparatus of claim 1 further including adjustment means disposed between said seat and said rear frame assembly.

8. The apparatus of claim 7 wherein said adjustment means disposed between said seat and said rear frame assembly includes telescoping members defining through openings and a removable pin for disposing in said openings and maintaining a selected position of said seat.

9. The apparatus of claim 1 wherein said handlebar includes position indicating indicia.

10. The apparatus of claim 1 wherein said cross bar is disposed forward of said parallel frame members.

11. The apparatus of claim 1 wherein said handlebar is disposed forward of a plane defined by said parallel frame members.

12. A wheeled walker comprising, in combination,
a handlebar assembly and a seat assembly, said handlebar assembly including a pair of spaced-apart frame members having upper and lower ends,
a U-shaped handlebar,
means associated with said upper ends of said frame members for slidably receiving and securing said handlebar to said frame members in a desired position,
a pair of wheels secured for rotation to said lower ends of said frame members,
a first center frame member disposed substantially medially between and coupled to said pair of frame members and extending toward said seat assembly,
said seat assembly including a seat for receiving a user, a second center frame member extending toward said handlebar assembly, a third, center frame member coupled to said second center frame member and extending toward the rear of said seat assembly, a pair of caster wheels secured to said third center frame member, and
means for adjustably coupling said first center frame member and said second center frame member.

13. The walker of claim 12 wherein said adjustably coupling means includes a plurality of alignable openings in said first and said second center frame members and removable fastener means extending through pairs of said openings.

14. The walker of claim 13 wherein said fastener means are a pair of bolts and wing nuts.

15. The walker of claim 12 wherein said associated means is a threaded collar disposed about said frame member and said handlebar and a resilient annulus disposed adjacent said collar.

16. The walker of claim 12 wherein said parallel frame members include offset portions adjacent said lower ends.

17. The walker of claim 12 further including adjustment means disposed between said seat and said seat assembly.

18. An apparatus for people requiring support while walking comprising, in combination,
a forward, handlebar assembly,
a rearward, seat assembly, and
means for adjustably coupling said forward, handlebar assembly and said rearward, seat assembly,
said handlebar assembly including a pair of parallel, spaced-apart frame members having upper and lower ends, a handlebar having parallel, spaced-apart lower ends, means associated with said upper ends of said frame members and said lower ends of said handlebar for adjustably fixing the position of said handlebar relative to said frame members, a pair of wheels secured to a respective one of said lower ends of said frame members, and a center member coupled to said parallel frame members and extending toward said adjusting and coupling means,
said rearward seat assembly including a center member having a forward portion extending toward said coupling means and a rear portion, a seat secured to said center member of said seat assembly, a pair of caster wheels coupled to said rear portion of said center member of said seat assembly.

19. The apparatus of claim 18 wherein said adjusting and coupling means includes a plurality of aligned openings in said center members and fastener means extending through said pairs of openings.

20. The apparatus of claim 18 further including height adjustment means disposed between said seat and said center member of said seat assembly and wherein said associated means is a threaded collar disposed about said frame member and said handlebar and a resilient annulus disposed adjacent said collar.

* * * * *